(12) United States Patent
Berman et al.

(10) Patent No.: US 10,423,568 B2
(45) Date of Patent: Sep. 24, 2019

(54) APPARATUS AND METHOD FOR TRANSFERRING DATA AND COMMANDS IN A MEMORY MANAGEMENT ENVIRONMENT

(71) Applicant: MICROSEMI SOLUTIONS (U.S.), INC., Aliso Viejo, CA (US)

(72) Inventors: Oren Berman, Herzliya (IL); Stephen Bates, Canmore (CA)

(73) Assignee: Microsemi Solutions (U.S.), Inc., Aliso Viejo, CA (US)

( * ) Notice: Subject to any disclaimer, the term of this patent is extended or adjusted under 35 U.S.C. 154(b) by 206 days.

(21) Appl. No.: 15/385,158

(22) Filed: Dec. 20, 2016

(65) Prior Publication Data
US 2017/0177541 A1 Jun. 22, 2017

Related U.S. Application Data

(60) Provisional application No. 62/270,348, filed on Dec. 21, 2015.

(51) Int. Cl.
*G06F 15/173* (2006.01)
*H04L 29/08* (2006.01)
*G06F 3/06* (2006.01)

(52) U.S. Cl.
CPC ........ *G06F 15/17331* (2013.01); *G06F 3/067* (2013.01); *G06F 3/0611* (2013.01);
(Continued)

(58) Field of Classification Search
CPC .............. G06F 15/17331; G06F 3/0611; G06F 3/0659; G06F 3/0656; G06F 3/067; G06F 3/0679; H04L 67/1097
See application file for complete search history.

(56) References Cited

U.S. PATENT DOCUMENTS

| | | | |
|---|---|---|---|
| 6,725,348 B1 * | 4/2004 | Marier | G06F 3/0613 |
| | | | 710/39 |
| 6,931,501 B1 * | 8/2005 | Narayanaswamy | G06F 3/0613 |
| | | | 710/32 |

(Continued)

OTHER PUBLICATIONS

Metz, "The Performance Impact of NVMe and NVMe over Fabrics—Q&A," SNIA on Ethernet Storage, 7 pages, retrieved on Sep. 3, 2015, retrieved from URL: http://sniaesfblog.org/?p=379, 7 pages.

*Primary Examiner* — Kostas J Katsikis
(74) *Attorney, Agent, or Firm* — Leber IP Law; David C. Robertson (57) ABSTRACT

A method and system for transferring NVMe data over a network comprises using a discrete buffer memory device to generate a write command from an NVMe-over-RDMA write command request, store the user data from a client host of the network, and send an interrupt signal to a NVMe storage device of the network. The NVMe storage device retrieves the write command from the discrete buffer memory device and performs a direct memory access transfer of the stored user data from the discrete buffer memory device to the NVMe storage device. The discrete buffer memory device comprises a controller and a random access memory for generating commands and storing the commands in a submission queue of the random access memory. The controller can clear commands from the submission queue based on completion commands received in a completion queue of the random access memory.

13 Claims, 4 Drawing Sheets (52) U.S. Cl.
CPC .......... *G06F 3/0656* (2013.01); *G06F 3/0659* (2013.01); *G06F 3/0679* (2013.01); *H04L 67/1097* (2013.01)

(56) References Cited

U.S. PATENT DOCUMENTS

| | | | | |
|---|---|---|---|---|
| 7,130,932 B1* | 10/2006 | Ghaffari | | G06F 3/061 710/22 |
| 7,139,201 B2* | 11/2006 | Tanaka | | G06F 11/1008 365/185.29 |
| 7,774,540 B2* | 8/2010 | Han | | G11B 20/1816 711/112 |
| 7,849,259 B1* | 12/2010 | Wong | | G06F 3/061 710/53 |
| 8,768,890 B2* | 7/2014 | Burchall | | G06F 11/1471 707/649 |
| 9,652,164 B2* | 5/2017 | Rose | | G06F 3/0679 |
| 9,910,786 B2* | 3/2018 | Freyensee | | G06F 12/10 |
| 9,921,914 B2* | 3/2018 | Ptak | | G06F 11/1096 |
| 10,275,160 B2* | 4/2019 | Freyensee | | G06F 3/061 |
| 2001/0011323 A1* | 8/2001 | Ohta | | G06F 3/061 711/112 |
| 2001/0020260 A1* | 9/2001 | Kanamaru | | G06F 3/061 711/4 |
| 2002/0004889 A1* | 1/2002 | Honma | | G06F 3/0613 711/154 |
| 2003/0163720 A1* | 8/2003 | Shutoku | | G06F 3/0611 713/193 |
| 2003/0172207 A1* | 9/2003 | Takasugi | | G06F 3/0607 710/52 |
| 2003/0172229 A1* | 9/2003 | Takasugi | | G06F 3/0614 711/112 |
| 2004/0054851 A1* | 3/2004 | Acton | | G06F 11/1441 711/118 |
| 2006/0106980 A1* | 5/2006 | Kobayashi | | G06F 3/0611 711/113 |
| 2007/0239944 A1* | 10/2007 | Rupanagunta | | G06F 3/0613 711/147 |
| 2009/0193183 A1* | 7/2009 | Kudo | | G11C 7/1027 711/103 |
| 2010/0299558 A1* | 11/2010 | Tojo | | G06F 11/1441 714/14 |
| 2012/0102257 A1* | 4/2012 | Lin | | G06F 3/0613 710/315 |
| 2012/0110259 A1* | 5/2012 | Mills | | G06F 13/00 711/113 |
| 2013/0086311 A1* | 4/2013 | Huang | | G06F 13/1689 711/103 |
| 2013/0198311 A1* | 8/2013 | Tamir | | G06F 15/167 709/212 |
| 2013/0198312 A1 | 8/2013 | Tamir et al. | | |
| 2014/0129206 A1* | 5/2014 | Cheng | | G06F 17/5022 703/24 |
| 2014/0223071 A1* | 8/2014 | Bert | | G06F 13/28 711/103 |
| 2015/0006663 A1 | 1/2015 | Huang et al. | | |
| 2015/0029808 A1* | 1/2015 | Allison | | G11C 5/005 365/227 |
| 2015/0143031 A1* | 5/2015 | Lu | | G06F 13/28 711/103 |
| 2015/0155044 A1* | 6/2015 | Yin | | G06F 13/28 365/185.24 |
| 2015/0193360 A1* | 7/2015 | Lu | | G06F 13/28 710/48 |
| 2015/0324118 A1* | 11/2015 | McCambridge | | G06F 3/0613 710/5 |
| 2015/0331637 A1* | 11/2015 | Aguilar | | G06F 3/0659 711/103 |
| 2016/0070470 A1* | 3/2016 | Uchida | | G06F 3/061 711/103 |
| 2016/0132237 A1* | 5/2016 | Jeong | | G06F 3/061 711/103 |
| 2016/0147671 A1* | 5/2016 | Vishne | | G06F 12/12 711/135 |
| 2016/0162202 A1* | 6/2016 | Singhai | | G06F 3/0613 711/103 |
| 2016/0162416 A1* | 6/2016 | Boyd | | G06F 13/28 711/202 |
| 2016/0335006 A1* | 11/2016 | Rose | | G06F 3/0679 |
| 2017/0083263 A1* | 3/2017 | Mirichigni | | G06F 12/0891 |
| 2017/0123921 A1* | 5/2017 | Ptak | | G06F 11/1096 |
| 2017/0123995 A1* | 5/2017 | Freyensee | | G06F 12/10 |
| 2017/0177216 A1* | 6/2017 | Freyensee | | G06F 3/061 |

\* cited by examiner

APPARATUS AND METHOD FOR TRANSFERRING DATA AND COMMANDS IN A MEMORY MANAGEMENT ENVIRONMENT

CROSS-REFERENCE TO RELATED APPLICATIONS

This application claims the benefit of U.S. Provisional Application No. 62/270,348, filed Dec. 21, 2015, which is herein incorporated by reference.

FIELD

The present disclosure relates to Peripheral Component Interconnect Express (PCIe) and Non-Volatile Memory Express (NVMe) data storage and communications.

BACKGROUND

Non-Volatile Memory Express (NVMe) is a leading technology for directly connecting storage (e.g., a solid state drive (SSD) or Flash drive) to a host (e.g., a computer or server) via a Peripheral Component Interconnect Express (PCIe) interface. The directly-connected host transfers data to and from an NVMe storage device using direct memory access (DMA).

When implemented in a network, for example, the host (e.g., a server) directly attached to the NVMe storage device may also be connected to other computers (e.g., clients) through the network. The client computers, which are not directly attached to the NVMe storage device, access the NVMe storage device in a conventional manner through the network and the server.

RDMA (Remote Direct Memory Access) and NVMe-over-RDMA are known protocols for enabling remotely-connected hosts to transfer data to and from the NVMe storage device. For example, in a write operation, the RDMA protocol communicates data from the system memory of the client over a network to the system memory of the server. At the server, the data is buffered in the system memory of the server, and then the NVMe storage device may access the buffered data. If the server is attached to many clients and each client wishes to access the storage device(s) of the server, the system memory of the server may become a bottleneck.

A known improvement of the RDMA method partially lessens the bottleneck caused by the system memory of the server by utilizing a buffer memory associated with the controller of the NVMe storage device. However, this known method still depends on the involvement of the system memory of the server host and further requires use of special, proprietary, or non-standard NVMe storage devices, limiting the compatibility of this known method in various system implementations.

Therefore, improvements to networked-NVMe transfer approaches are desirable.

BRIEF DESCRIPTION OF THE DRAWINGS

Embodiments of the present disclosure will now be described, by way of example only, with reference to the attached Figures.

DETAILED DESCRIPTION

The present disclosure provides a method and system for transferring NVMe data over a network. Embodiments of the present disclosure comprise using a discrete buffer memory device to transfer the user data from a client host of the network, and process command requests so that a NVMe storage device of the network can be instructed to directly access the memory of the discrete buffer memory. In an implementation, the discrete buffer memory device comprises a controller and a random access memory for generating commands and storing the commands in a submission queue of the random access memory. The controller can clear commands from the submission queue based on completion commands received in a completion queue of the random access memory.

Embodiments of the method and system according to the present disclosure provide improvements to NVMe-over-RDMA operations. In particular, these improvements reduce or eliminate the bottleneck caused by the system memory of a server host, which is found in conventional RDMA approaches, without necessitating the use of special, proprietary, or non-standard NVMe storage devices that include a memory buffer. By using a discrete buffer memory device according to the embodiments of the present disclosure, the involvement of the server's CPU and/or the server's system memory, in the data transfer between the client and the NVMe storage device attached to the server, may be reduced or eliminated.

An embodiment of the present disclosure provides a discrete buffer memory device comprising: a peripheral component interconnect express (PCIe) bus interface for connecting the discrete buffer memory device to a server host, the server host in communication with a plurality of NVMe storage devices and the server host in communication with a client host through a network; a controller connected to the PCIe bus for, independently of the server host: receiving a non-volatile memory express (NVMe)-over-remote direct memory access (RDMA) write command request and user data from the client host, generating a write command from the NVMe-over-RDMA write command request, and sending an interrupt signal to a particular NVMe storage device of the plurality; and a random access memory connected to the controller for, independently of the server host, storing the user data received from the client host and storing the write command.

In an embodiment, the present disclosure provides a system comprising: a client host having user data stored thereon, the client host configured to generate a non-volatile memory express (NVMe)-over-remote direct memory access (RDMA) write command request for requesting a direct memory access transfer of the user data; a server host in communication with the client host through a network; a NVMe storage device in communication with the server host; and a discrete buffer memory device in communication with the server host, the discrete buffer memory device configured to, independently of the server host: generate a write command from the NVMe-over-RDMA write command request; store the user data from the client host; and send an interrupt signal to the NVMe storage device.

In an example embodiment, the discrete buffer memory device comprises: a controller for generating the write command; and a random access memory for storing the user data and storing the write command in a submission queue allocated in the random access memory.

In an example embodiment, the controller is configured to submit the write command into the submission queue and send the interrupt signal for the NVMe storage device to retrieve the write command from the submission queue.

In an example embodiment, the interrupt signal causes the NVMe storage device to retrieve the write command from the random access memory, perform the direct memory access transfer of the stored user data from the random access memory to the NVMe storage device, generate a completion command, perform a direct memory access transfer of the completion command into a completion queue allocated in the random access memory of the discrete buffer memory device, and send a second interrupt signal to the controller of the discrete buffer memory device.

In an example embodiment, the controller, upon receiving the second interrupt signal, is configured to clear from the submission queue the write command associated with the completion command, generate from the completion command a response to the NVMe-over-RDMA write command request, and transmit the response to the client host.

In an example embodiment, the system further comprises a plurality of NVMe storage devices attached to the server host and a plurality of submission queues are allocated in the random access memory of the discrete buffer memory device such that each submission queue is associated with a respective NVMe storage device of the plurality of NVMe storage devices.

In an example embodiment, the NVMe-over-RDMA write command request is associated with a particular NVMe storage device of the plurality and the controller is configured to generate the write command according to the particular NVMe storage device and submit the write command into a particular submission queue associated with the particular NVMe storage device.

In an example embodiment, the discrete buffer memory device further comprises: a battery for providing power to the device during a power failure; and a non-volatile Flash memory for storing the data and commands from the random access memory, during and after the power failure.

In an example embodiment, the discrete buffer memory device comprises a virtual-to-logical block address mapping table for storing logical block addresses of the plurality of NVMe devices.

In an example embodiment, the discrete buffer memory device configures the server host to route NVMe-over-RDMA requests and the user data to the discrete buffer memory device.

In another embodiment, the present disclosure provides a discrete buffer memory device comprising: a peripheral component interconnect express (PCIe) bus interface for connecting the discrete buffer memory device to a server host, the server host in communication with a plurality of NVMe storage devices and the server host in communication with a client host through a network; a controller connected to the PCIe bus for, independently of the server host: receiving a non-volatile memory express (NVMe)-over-remote direct memory access (RDMA) write command request and user data from the client host, generating a write command from the NVMe-over-RDMA write command request, and sending an interrupt signal to a particular NVMe storage device of the plurality; and a random access memory connected to the controller for, independently of the server host, storing the user data received from the client host and storing the write command.

In an example embodiment, a plurality of submission queues are allocated in the random access memory of the discrete buffer memory device such that each submission queue is associated with a respective NVMe storage device of the plurality of NVMe storage devices.

In an example embodiment, the NVMe-over-RDMA write command request is associated with the particular NVMe storage device of the plurality of NVMe storage devices and the controller is configured to generate the write command according to the particular NVMe storage device and submit the write command into a particular submission queue associated with the particular NVMe storage device.

In an example embodiment, the controller is configured to submit the write command into the particular submission queue and send the interrupt signal for the particular NVMe storage device to retrieve the write command from the particular submission queue.

In an example embodiment, a completion queue is allocated in the random access memory of the discrete buffer memory device, and the completion queue receives a direct memory access transfer of a completion command generated from the particular NVMe storage device after the interrupt signal causes the particular NVMe storage device to retrieve the write command from the random access memory and perform a direct memory access transfer of the stored user data from the random access memory to the particular NVMe storage device.

In an example embodiment, the controller receives a second interrupt signal from the particular NVMe storage device, clears from the submission queue the write command associated with the completion command, generates from the completion command a response to the NVMe-over-RDMA write command request, and transmits the response to the client host.

In an example embodiment, the discrete buffer memory device further comprises a battery for providing power to the device during a power failure, and a non-volatile Flash memory for storing the data and commands from the random access memory, during and after the power failure.

In an example embodiment, the discrete buffer memory device further comprises a virtual-to-logical block address mapping table for storing logical block addresses of the plurality of NVMe devices.

In an example embodiment, the controller configures the server host to route NVMe-over-RDMA requests and the user data to the discrete buffer memory device.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

Before describing details of embodiments of the present disclosure, further discussion of the surrounding context will be provided.

The NVMe protocol is a logical protocol for block device access of local storage devices. The NVMe protocol is designed to deal with local non-volatile memory access using logical block addresses (LBA) for read and write input/output (IO) commands. The NVMe protocol specification comprises submission queues for receiving commands, completion queues for clearing commands in submission queues, and a special memory-mapped PCIe address range in the storage device allocated for NVMe commands only. The NVMe command address range in the NVMe storage device acts as the interface for the host to communicate with the NVMe storage device.

The NVMe protocol is a latest generation storage protocol that is targeted to deliver low latency access to data. However, using NVMe devices in a network may increase the latency of access to data stored on a given NVMe device of the network. In a conventional network (not shown), the network interface controller (NIC) of the host attached to the given NVMe storage device adds an additional layer of processing and latency during remote access of NVMe storage devices.

The NVMe-over-Remote Direct Memory Access (RDMA) protocol simplifies the remote access of NVMe storage devices over the network by eliminating some intermediate processing between the host CPU and the NIC and by offloading some processing from the host CPU to the NIC. The NVMe-over-RDMA protocol also integrates the NVMe block device logical protocol with the DMA operations on the server host's system memory, allowing a client host to send and receive data to the NVMe storage device with less intermediate processing.

Figure 1:
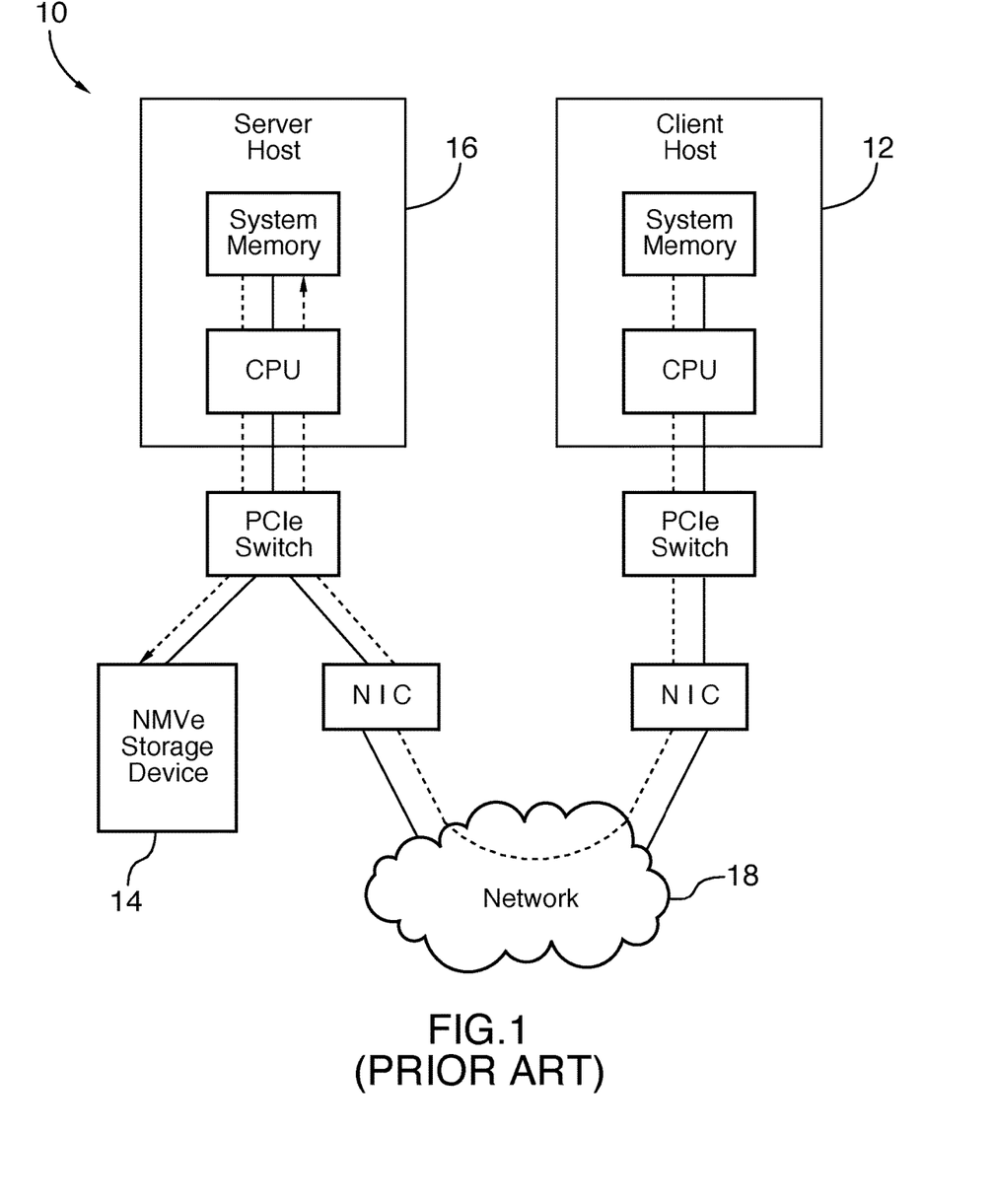
FIG. 1 illustrates a system and a known approach of sending data and commands from a system memory of a client host, over a network, to a system memory of a server host.

Despite this reduction of intermediate processing steps, the known NVMe-over-RDMA approach still carries significant inefficiencies, as described in relation to the example of FIG. 1.

FIG. 1 is a diagram showing a prior-art NVMe-over-RDMA system 10 and approach to remotely accessing an NVMe storage device. In a write operation, for example, a client host 12 sends a write command request data structure (according to the NVMe-over-RDMA protocol) and sends the user data for ultimately writing into an NVMe storage device 14.

The NVMe-over-RDMA write command data structure and the user data are transferred from the system memory of the client host 12 to the system memory of a server host 16 over a network 18 according to the RDMA mechanism described above. Once the user data and the write command request data structure are located in the system memory of the server host 16, the CPU of the server host 16 processes the write command request into a submission queue allocated in the system memory of the server host.

Finally, the server host's CPU signals for the NVMe storage device 14 to perform a DMA transfer of the user data from the system memory of the server host into a non-volatile memory of the NVMe storage device.

Though a read operation is not illustrated, it is similar to the write operation of FIG. 1.

In the operation of FIG. 1, both the system memory and the CPU of the server host 16 is accessed by the NVMe storage device 14 for the instant operation and is additionally accessed by other NVMe storage devices 14. Additionally, both the system memory and the CPU of the server host 16 are utilized for other operations. Therefore, the system memory of the server host 16 becomes a bottleneck.

In another known implementation of the NVMe protocol, a Controller Memory Buffer (CMB, not shown) is integrated with each NVMe storage device 14 and partially assumes some of the NVMe-over-RDMA operations of the server host's CPU and system memory. The CMB is a controller and buffer memory integrated inside the NVMe storage device.

The buffer memory of the CMB stores user data for the internal NVMe non-volatile memory to perform a DMA transfer. Although the CMB approach helps reduce data transfer between the system memory of the server host and the NVMe non-volatile memory of the CMB, the approach still depends on the CPU and system memory of the server host 16 to manage and process NVMe-over-RDMA command requests and NVMe device interrupts. In particular, submission and completion queues are instantiated in the server host 16 memory, while the server host 16 CPU must parse the NVMe-over-RDMA commands and send the parsed commands to the submission queue in the server host 16 memory. Therefore, the processes still depend on the server host 16 and the system memory of the server host 16 may still become a bottleneck.

Furthermore, the known CMB approach also creates significant limitations that affect the practicality and compatibility of the CMB approach. The CMB approach requires use of special, proprietary, or non-standard NVMe storage devices. These special NVMe storage devices require extra memory, which increases the cost of the NVMe storage device. Additionally, an NVMe storage device that supports CMB only supports a limited size CMB due to NVMe storage device size limitations.

Another limitation of the known CMB approach is that the CMB uses a volatile memory and the user data transferred to and buffered in the CMB's volatile memory can be lost during a power failure.

Another limitation is, in the case of multiple NVMe storage devices attached to the server host, that the client host must be aware of the topology of the NVMe storage devices attached to the server host and their respective CMB addresses.

Another limitation, in the case of the multiple NVMe storage devices attached to the server host, is the need to synchronize the accesses to the CMB with the server host CPU and the server host NIC. Since there is no indication that the CMB is occupied by user data that is sent by the server host CPU to the CMB, any data transfer using the RDMA protocol from the NIC of the server host into the CMB may cause data corruption.

Accordingly, the present disclosure provides a system comprising a discrete buffer memory device for overcoming one or more of the deficiencies in the known approaches described above. The discrete buffer memory device allows for NVMe-over-RDMA to be used either with conventional NVMe storage devices (i.e., devices which do not have CMBs) or NVMe devices with CMBs.

A discrete buffer memory device according to an embodiment of the present disclosure provides a cost effective solution to effectively support NVMe-over-RDMA protocol data transfers without the need to implement a customized or proprietary solution such as CMB. In an embodiment, the discrete buffer memory device is used to eliminate the server host CPU involvement with parsing the NVMe-over-RDMA commands and sending the parsed commands to a NVMe submission queue. In an embodiment, the discrete buffer memory device additionally eliminates the need for the NVMe storage device attached to the server host to transfer the NVMe command data structures between the system memory of the server host and the NVMe device itself. In an embodiment, the discrete buffer memory device is also used to eliminate the client host from being aware of the topology of the NVMe storage devices attached to the server host. Furthermore, in an embodiment the discrete buffer memory device allows for extended functionality such as virtualization of multiple storage devices attached to the server.

Figure 2:
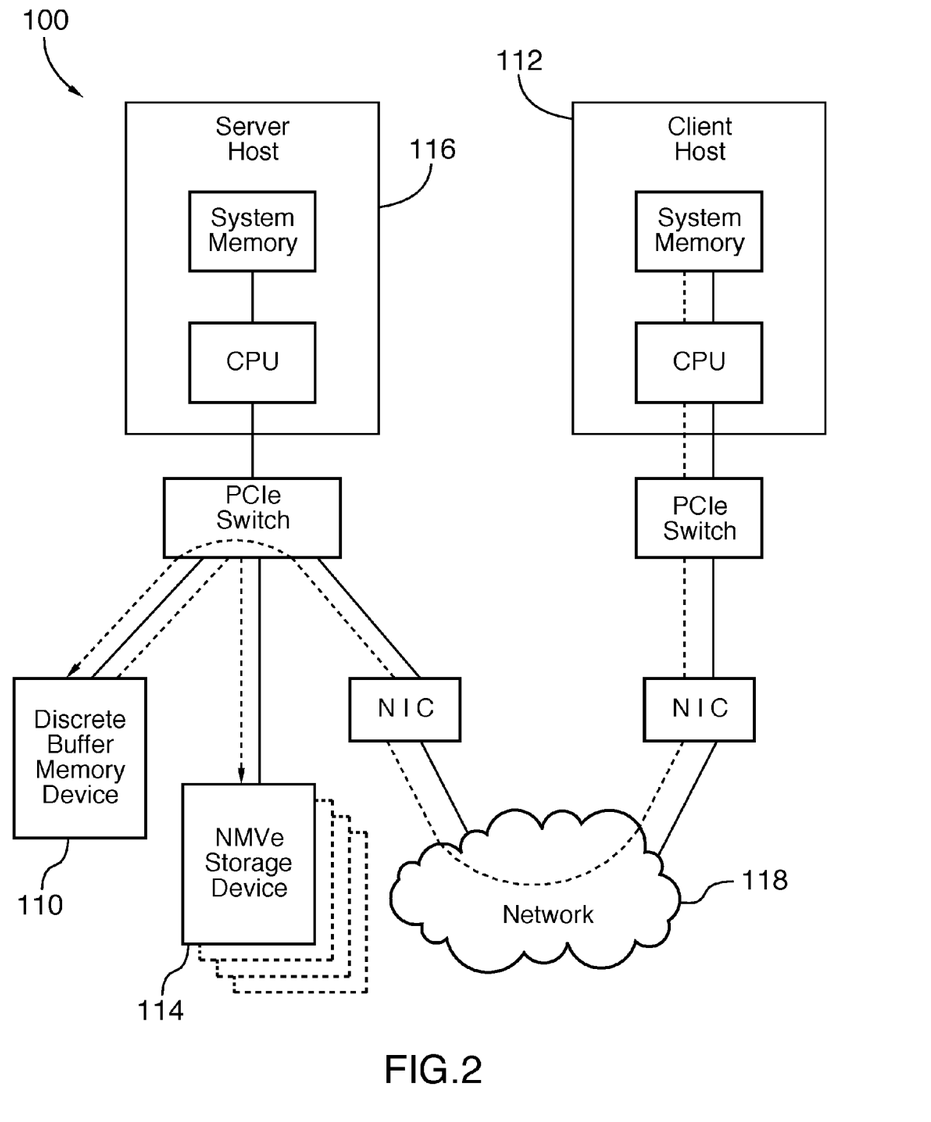
FIG. 2 illustrates a system including a discrete buffer memory device according to an embodiment of the present disclosure.

FIG. 2 is a diagram showing an example implementation of a system 100 comprising a discrete buffer memory device 110 according to an embodiment of the present disclosure. The system 100 comprises the discrete buffer memory device 110 in communication with a server host 116. The discrete buffer memory device 110 may comprise a PCIe bus interface (shown in FIG. 3) for communicating with the server host 116. The connection between the discrete buffer memory device 110 and the server host 116 may further comprise a PCIe switch for routing PCIe traffic.

The server host 116 is in communication with a client host 112 through a network 118. In an example implementation, each of the server host 116 and the client host 112 connect to the network 118 through a network interface controller (NIC) connected to a PCIe switch.

The server host 116 is also in communication with a NVMe storage device 114 through the PCIe bus interface, which may also comprise the PCIe switch. The system 100 may optionally comprise additional NVMe storage devices 114 so that the server host 116 is in communication with a plurality of NVMe storage devices 114.

In an example write operation of the system 100, the client host 112 has user data that it wishes to write to the NVMe storage device 114. The client host generates a NVMe-over-RDMA write command request for requesting a direct memory access transfer of the user data. In an example embodiment, the discrete buffer memory device 110 is discrete in that it is separate and distinct from both the server host 116 and the NVMe storage device 114.

In an embodiment, the discrete buffer memory device 110 has configured the PCIe switch of the server host 116 to route NVMe-over-RDMA requests and user data, for each NVMe storage device 114 attached to server host 116, to the discrete buffer memory device 110. Therefore, the request and user data from the client host 112 are sent to the discrete buffer memory device 110.

The discrete buffer memory device 110 generates a write command based on the NVMe-over-RDMA write command request, and stores the write command in internal memory of the discrete buffer memory device 110, for example in RAM 124 discussed below in relation to FIG. 3. The discrete buffer memory device 110 also stores the user data from the client host 112, and sends an interrupt signal to the NVMe storage device 114. These operations by the discrete buffer memory device 110 are performed independently of the server host 116.

The interrupt signal instructs the NVMe storage device 114 to retrieve the write command from the discrete buffer memory device 110. The write command enables the NVMe storage device 114 to perform the direct memory access transfer of the stored user data from the discrete buffer memory device 110 to the NVMe storage device 114.

Figure 3:
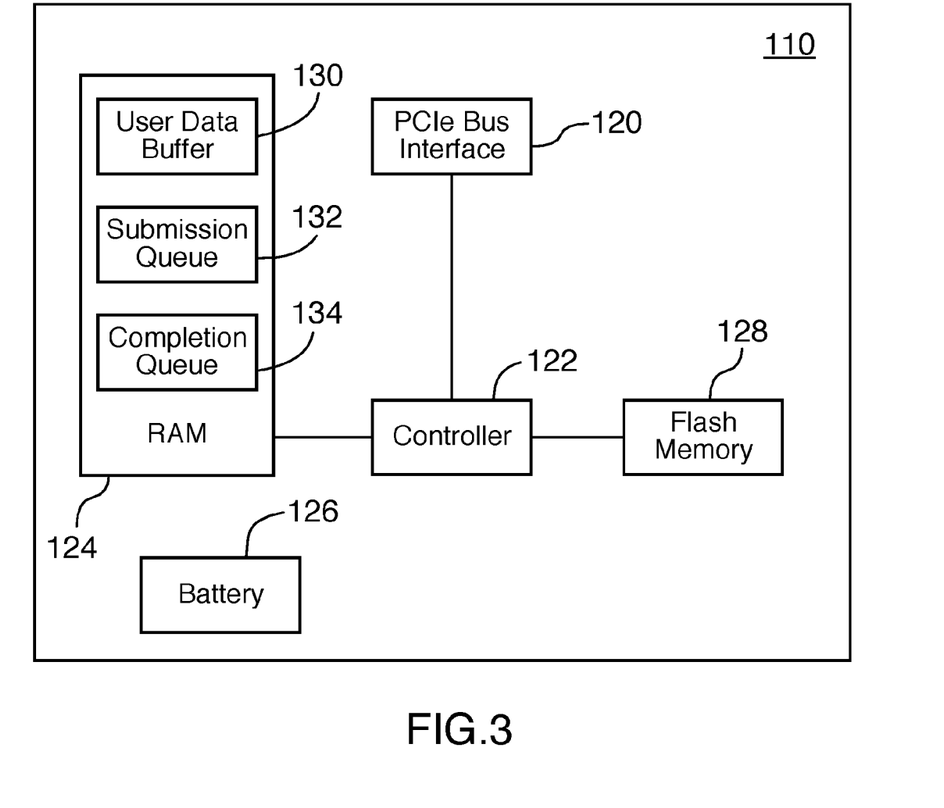
FIG. 3 illustrates a more detailed view of the discrete buffer memory device according to an embodiment of the present disclosure.

FIG. 3 is a block diagram illustrating in greater detail a discrete buffer memory device 110 according to an embodiment of the present disclosure. FIG. 3 shows the discrete buffer memory device system hardware (HW) components.

The discrete buffer memory device 110 comprises a PCIe bus interface 120 for connecting the discrete buffer memory device 110 to the server host 116.

The discrete buffer memory device 110 also comprises a controller 122 connected to the PCIe bus interface 120. The controller 122 receives the NVMe-over-RDMA write command request and user data from the client host 112 through the PCIe bus interface 120. The controller 122 also generates and sends the interrupt signal to the NVMe storage device 114 through the PCIe bus interface 120.

The controller 122 is connected to a random access memory (RAM) 124 for storing the user data received from the client host 112 and storing the write command generated by the controller 122. The RAM 124 may be a double data rate (DDR) RAM connected to the controller 122 through a DDR memory bus.

The interrupt signal sent over the PCIe bus interface 120 causes the NVMe storage device 114 to retrieve the write command from the RAM 124 and perform a direct memory access transfer of the stored user data from the RAM 124 to the NVMe storage device 114.

The above-mentioned operations of the controller 122 are performed independently of the server host 116.

In a further embodiment, the discrete buffer memory device 110 comprises a battery 126 and a non-volatile memory 128. The controller 122 is connected to non-volatile memory 128 by a Flash bus. Since the RAM 124 is a volatile memory, any data buffered or stored on the RAM 124 will be lost when the discrete buffer memory device 110 loses power.

In the case of a power failure or power shutdown event, the battery 126 provides the discrete buffer memory device 110 with power. Thus, the controller 122 can transfer or backup data from the RAM 124 to the non-volatile memory 128. On boot time, the controller 122 can load the data from the non-volatile memory 128 back into the RAM 124 and continue to work from the last state it stopped at due to the power down event. Although non-volatile memory 128 is illustrated in an example embodiment in FIG. 3 as a Flash memory, this is not meant to be limiting in any way, and other non-volatile memory technologies, such as Ferroelectric RAM, Magnetoresistive RAM and resistive RAM, without limitation, are particularly envisioned without exceeding the scope.

The client host 112 has direct memory access to the discrete buffer memory device 110 because the discrete buffer memory device 110 is exposed to the client host 112 according to the PCIe standard via memory mapping. Specifically, the client host 112 has address space allocated for mapping to hardware registers of the discrete buffer memory device 110 and for mapping to RAM 124 addresses of the discrete buffer memory device 110. The PCIe memory map of the discrete buffer memory device 110 in the client host 112 is divided into the following three types of memory address ranges:

1) PCIe registers map as defined by the PCIe standard—this interface is used by the host to read/write to the PCIe registers of the device.

2) NVMe registers map (a subset of the PCIe registers address range) as defined by the NVMe standard—this interface is used by the host to read/write to the NVMe registers of the device.

3) Random access memory (RAM)—mapped as PCIe BAR (base address register) area as specified in PCIe standard specification. The client host 112 can directly access the RAM 124 of the discrete buffer memory device 110 by addressing according to this memory map.

Embodiments of the present disclosure overcome one or more of the limitations of known approaches by providing a discrete buffer memory device 110 that enables access, according to the NVMe-over-RDMA protocol, between the client host 112 and the NVMe storage device 114, independently of the server host 116. In other words, the discrete buffer memory device 110 can perform necessary NVMe-over-RDMA protocol tasks without the intervention of the server host system memory and CPU.

Referring to FIG. 3, in addition to storing user data in a buffer space 130 of the RAM 124, the discrete buffer memory device 110 also manages NVMe submission queues 132 and completion queues 134 associated with the NVMe storage devices 114, and which are instantiated addresses of the RAM 124 allocated for this purpose. In the case of a plurality of NVMe storage devices, as optionally shown in FIG. 2, the discrete buffer memory device 110 manages the submission and completion queues associated with each of the plurality of NVMe storage devices.

According to an embodiment of the present disclosure, the NVMe-over-RDMA request is transferred through the network (including the NIC and the PCIe switch), to the discrete buffer memory device 110. The NVMe-over-RDMA command data structures are stored into a PCIe address range that is allocated in the RAM 124 for managing NVMe submission and completion queues.

Figure 4:
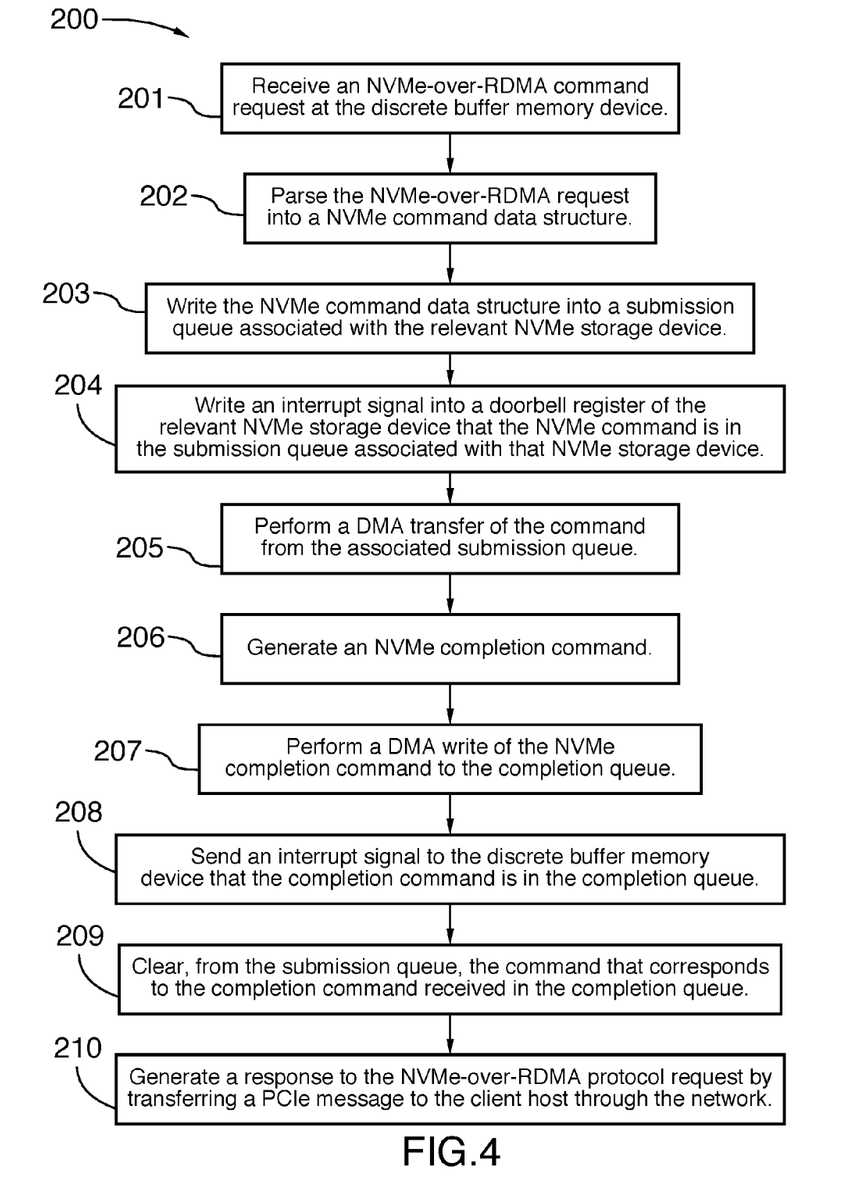
FIG. 4 illustrates a method of managing NVMe-over-RDMA command data structures and managing NVMe submission and completion queues according to an embodiment of the present disclosure.

FIG. 4 is a flowchart illustrating a method 200 of processing NVMe-over-RDMA command request data structures and managing NVMe submission and completion queues. Relevant portions of the flowchart are performed by controller 122 operating on electronically readable instructions stored on an associated memory. In one embodiment the electronically readable instructions are stored in non-volatile memory 128.

At 201, the discrete buffer memory device 110 receives an NVMe-over-RDMA command request.

Next, at 202, controller 122 parses the NVMe-over-RDMA request into a NVMe command data structure.

At 203, the controller 122 writes the NVMe command data structure into a submission queue 132 associated with the relevant NVMe storage device 114, where the submission queue 132 is instantiated in addresses of the RAM 124 allocated for this purpose.

At 204, the discrete buffer memory device 110 generates and writes an interrupt signal into a doorbell register of the relevant NVMe storage device 114 indicative that an NVMe command is in the submission queue 132 associated with that NVMe storage device 114.

Upon receiving the interrupt signal, at 205, the NVMe storage device 114 performs a DMA transfer of the command from the associated submission queue 132 in the RAM 124. In an embodiment of the present disclosure, the command instructs the NVMe storage device 114 to perform a DMA transfer of user data from specific buffer space 130 addresses in the RAM 124 where the user data is stored.

Upon completion of handling the NVMe command (e.g., performing the DMA transfer), at 206, the NVMe storage device 114 generates an NVMe completion command.

At 207, the NVMe storage device 114 performs a DMA write of the NVMe completion command to the completion queue 134 in the RAM 124.

At 208, the NVMe storage device 114 sends an interrupt signal to the discrete buffer memory device 110 that the completion command is in the completion queue 134.

Upon receiving the interrupt signal, at 209, the controller 122 clears, from the submission queue 132, the command that corresponds to the completion command received in the completion queue 134.

At 210, controller 122 generates a response to the NVMe-over-RDMA protocol request by transferring a PCIe message to the client host 112 through the network 118.

In a further embodiment of the present disclosure, the discrete buffer memory device 110 also comprises a virtual-to-logical (V2L) block address mapping table (not shown) for storing logical block addresses of the plurality of NVMe devices 114. The discrete buffer memory device 110 can receive an NVMe-over-RDMA request and decide which of the NVMe storage devices 114 will handle the request. For example, the virtual-to-logical table comprises virtual block address entries X that store the NVMe storage device number N and the real LBA address in the NVMe storage device N.

The discrete buffer memory device 110 only exposes the V2L table to its internal controller 122. The discrete buffer memory device 110 exposes the virtual block addresses to the client host 112. In an embodiment, the exposed virtual block addresses indicate to the client host 112 that the discrete buffer memory device 110 has a storage capacity equal to the sum total of the storage capacities of the plurality of NVMe devices 114. The V2L table allows the discrete buffer memory device 110 to hide the topology of the NVMe storage devices 114.

Various embodiments of the present disclosure provide a number of advantages over known NVMe-over-RDMA approaches.

The discrete buffer memory device 110 provides a cost effective solution to effectively support NVMe-over-RDMA without the need to implement a customized and proprietary solution such as CMB.

Furthermore, the discrete buffer memory device 110 may be used to eliminate the server host CPU involvement with parsing the NVMe-over-RDMA commands and sending the parsed commands to a NVMe submission queue. The discrete buffer memory device additionally eliminates the need for the NVMe storage device attached to the server host to transfer the NVMe command data structures between the system memory of the server host and the NVMe device itself.

Furthermore, the discrete buffer memory device may allow for extended functionality such as virtualization of multiple storage devices attached to the server.

The discrete buffer memory device may also be used to hide the topology of the NVMe storage devices from the client host.

The discrete buffer memory device may also provide a power failure recovery management method. This is enabled in an example embodiment in which the discrete buffer memory device, which includes a battery backup, makes sure that any data that is already located in the nonvolatile random access memory of the discrete buffer memory device will be flushed into the discrete buffer memory device non-volatile memory upon sudden power failure.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A system comprising:
   a client host having user data stored thereon, the client host configured to generate a non-volatile memory express (NVMe)-over-remote direct memory access (RDMA) write command request for requesting a direct memory access transfer of the user data;
   a server host in communication with the client host through a network;
   at least one NVMe storage device in communication with the server host; and
   a discrete buffer memory device in communication with the server host, the discrete buffer memory device configured to, independently of the server host:
   generate a write command from the NVMe-over-RDMA write command request;
   store the user data from the client host; and
   send an interrupt signal to the at least one NVMe storage device,
   the discrete buffer memory device comprising:
      a controller for generating the write command; and
      a random access memory for storing the user data and storing the write command in at least one submission queue allocated in the random access memory,
      the controller being configured to
         submit the write command into the at least one submission queue and
         send the interrupt signal for the at least one NVMe storage device to retrieve the write command from the at least one submission queue,
      the interrupt signal causing the at least one NVMe storage device to
         retrieve the write command from the random access memory,
         perform the direct memory access transfer of the stored user data from the random access memory to the at least one NVMe storage device,
         generate a completion command,
         perform a direct memory access transfer of the completion command into a completion queue allocated in the random access memory of the discrete buffer memory device, and
         send a second interrupt signal to the controller of the discrete buffer memory device.

2. The system of claim 1, wherein the controller, upon receiving the second interrupt signal, is configured to clear from the at least one submission queue the write command associated with the completion command, generate from the completion command a response to the NVMe-over-RDMA write command request, and transmit the response to the client host.

3. The system of claim 2, wherein the at least one NVMe storage device comprises a plurality of NVMe storage devices attached to the server host and the at least one submission queue comprises a plurality of submission queues, such that each submission queue of the plurality of submission queues is associated with a respective NVMe storage device of the plurality of NVMe storage devices.

4. The system of claim 3, wherein the NVMe-over-RDMA write command request is associated with a particular NVMe storage device of the plurality of NVMe storage devices and the controller is configured to generate the write command according to the particular NVMe storage device and submit the write command into a particular submission queue associated with the particular NVMe storage device.

5. The system of claim 3, wherein the discrete buffer memory device comprises a virtual-to-logical block address mapping table for storing logical block addresses of the plurality of NVMe devices.

6. The system of claim 1, wherein the discrete buffer memory device configures the server host to route NVMe-over-RDMA requests and the user data to the discrete buffer memory device.

7. The system of claim 1, wherein the discrete buffer memory device further comprises:
   a battery for providing power to the device during a power failure; and
   a non-volatile memory for storing the data and commands from the random access memory, during and after the power failure.

8. A discrete buffer memory device comprising:
   a peripheral component interconnect express (PCIe) bus interface for connecting the discrete buffer memory device to a server host, the server host in communication with a plurality of NVMe storage devices and the server host in communication with a client host through a network;
   a controller connected to the PCIe bus for, independently of the server host:
      receiving a non-volatile memory express (NVMe)-over-remote direct memory access (RDMA) write command request and user data from the client host,
      generating a write command from the NVMe-over-RDMA write command request, and
      sending an interrupt signal to a particular NVMe storage device of the plurality; and
   a random access memory connected to the controller for, independently of the server host, storing the user data received from the client host and storing the write command, a plurality of submission queues being allocated in the random access memory such that each submission queue is associated with a respective NVMe storage device of the plurality of NVMe storage devices,
   the NVMe-over-RDMA write command request being associated with the particular NVMe storage device of the plurality of NVMe storage devices and the controller being configured to
      generate the write command according to the particular NVMe storage device,
      submit the write command into a particular submission queue associated with the particular NVMe storage device, and
      send the interrupt signal for the particular NVMe storage device to retrieve the write command from the particular submission queue.

9. The discrete buffer memory device of claim 8, wherein a completion queue is allocated in the random access memory of the discrete buffer memory device, and the completion queue receives a direct memory access transfer of a completion command generated from the particular NVMe storage device after the interrupt signal causes the particular NVMe storage device to retrieve the write command from the random access memory and perform a direct memory access transfer of the stored user data from the random access memory to the particular NVMe storage device.

10. The discrete buffer memory device of claim 9, wherein the controller receives a second interrupt signal from the particular NVMe storage device, clears from the submission queue the write command associated with the completion command, generates from the completion command a response to the NVMe-over-RDMA write command request, and transmits the response to the client host.

11. The discrete buffer memory device of claim 8, further comprising a battery for providing power to the device during a power failure, and a non-volatile memory for storing the data and commands from the random access memory, during and after the power failure.

12. The discrete buffer memory device of claim 8, further comprising a virtual-to-logical block address mapping table for storing logical block addresses of the plurality of NVMe devices.

13. The discrete buffer memory device of claim 8, wherein the controller configures the server host to route NVMe-over-RDMA requests and the user data to the discrete buffer memory device.

\* \* \* \* \*